（12）United States Patent
Lanca Coelho et al.

(10) Patent No.: US 9,909,274 B2
(45) Date of Patent: Mar. 6, 2018

(54) WIND TURBINE PARTS HANDLING METHOD AND DEVICE

(71) Applicant: ALSTOM RENEWABLE TECHNOLOGIES, Grenoble (FR)

(72) Inventors: Miguel Lanca Coelho, Barcelona (ES); Borja Aguiló, Barcelona (ES)

(73) Assignee: ALSTOM Renewable Technologies, Grenoble (FR)

( * ) Notice: Subject to any disclaimer, the term of this patent is extended or adjusted under 35 U.S.C. 154(b) by 0 days.

(21) Appl. No.: 15/066,995

(22) Filed: Mar. 10, 2016

(65) Prior Publication Data
US 2016/0265180 A1 Sep. 15, 2016

(30) Foreign Application Priority Data

Mar. 13, 2015 (EP) .................................... 15382116

(51) Int. Cl.
*E02B 17/02* (2006.01)
*B63B 35/00* (2006.01)
(Continued)

(52) U.S. Cl.
CPC .............. *E02B 17/02* (2013.01); *B63B 21/56* (2013.01); *B63B 35/003* (2013.01); *F03D 13/10* (2016.05);
(Continued)

(58) Field of Classification Search
CPC ................... E02B 17/02; E02B 17/027; E02B 2017/0039; E02B 2017/0091; E02B 2017/0043; B63B 35/003; B63B 21/56;
B63B 21/00; B63B 35/301; B63B 35/44;
F03D 1/001; F03D 1/005; F03D 13/10;
Y02E 10/727; E02D 23/02
(Continued)

(56) References Cited

U.S. PATENT DOCUMENTS 3,036,438 A * 5/1962 Sims ..................... E02B 17/027
405/206
3,347,052 A * 10/1967 Steitle ................... E02B 17/027
114/265
(Continued)

FOREIGN PATENT DOCUMENTS

| GB | 2454585 A | 5/2009 |
| WO | WO 2010/018359 A2 | 2/2010 |
| WO | WO 2011/083021 A2 | 7/2011 |

OTHER PUBLICATIONS

Extended European search report for European Application No. 15382116.0, dated Sep. 14, 2015, 8 pages.
(Continued)

*Primary Examiner* — Carib A Oquendo
(74) *Attorney, Agent, or Firm* — Dority & Manning, P.A.

(57) ABSTRACT

At least one handling device is provided having at least one floating member with first and second mutually opposite portions between which a transitional surface at least partially extends defining an interior. The device has an offshore part receiving portion therein to at least partially receive the offshore part. The floating member is simply installed in the offshore part so that it at least partially surrounds its outer surface. The offshore part thus floats on the water for being transported to an intended destination.

15 Claims, 2 Drawing Sheets

(51) Int. Cl.
*B63B 21/56* (2006.01)
*F03D 13/25* (2016.01)
*F03D 13/10* (2016.01)
*F03D 13/40* (2016.01)
*E02B 17/00* (2006.01)

(52) U.S. Cl.
CPC ............ *F03D 13/25* (2016.05); *F03D 13/40* (2016.05); *E02B 2017/0039* (2013.01); *E02B 2017/0091* (2013.01); *F05B 2230/6102* (2013.01); *Y02E 10/727* (2013.01); *Y02P 70/523* (2015.11)

(58) Field of Classification Search
USPC .................................. 405/203, 205, 206, 209
See application file for complete search history.

(56) References Cited

U.S. PATENT DOCUMENTS

| | | | | |
|---|---|---|---|---|
| 3,496,897 A * | 2/1970 | Saadeh | ................... | B63B 35/40 405/1 |
| 3,522,709 A * | 8/1970 | Vilain | ..................... | E21B 15/02 405/202 |
| 3,633,369 A * | 1/1972 | Lawrence | ............. | B63B 35/003 114/260 |
| 3,693,361 A * | 9/1972 | Koehler | ................ | E02B 17/027 114/267 |
| 3,815,372 A * | 6/1974 | Mott | ..................... | E02B 17/027 405/208 |
| 4,037,425 A * | 7/1977 | Berg | ......................... | F16L 1/24 405/200 |
| 4,135,842 A * | 1/1979 | Blight | ................... | E02B 17/027 114/264 |
| 4,534,678 A * | 8/1985 | Nakazato | ................ | E02B 17/02 405/204 |
| 5,111,764 A * | 5/1992 | D'Ettorre | .............. | B63B 35/003 114/259 |
| 6,209,474 B1 * | 4/2001 | Foss | ....................... | B63B 35/003 114/125 |
| 6,276,875 B1 * | 8/2001 | Gunnar | ................. | B63B 35/003 114/260 |
| 7,887,261 B2 * | 2/2011 | Stubler | ................ | B63B 35/003 405/203 |
| 8,770,126 B2 * | 7/2014 | Nielsen | ................... | B63B 21/00 114/123 |
| 2001/0027878 A1 * | 10/2001 | Roberts | ..................... | E21B 7/12 175/5 |
| 2007/0140794 A1 * | 6/2007 | Natvig | ................. | B63B 35/003 405/204 |
| 2012/0308358 A1 * | 12/2012 | Hynne | .................... | B63B 35/44 414/803 |
| 2013/0064606 A1 * | 3/2013 | Pionetti | ................... | B63B 21/50 405/166 |

OTHER PUBLICATIONS

WindFlipAS: "WindFlip—a specialized barge for transportation of floating wind turbines", uploaded Dec. 12, 2009, URL: https://www.youtube.com/watch?v=G0I3HCmANVc, 1 page.

Dvorak, Paul: Seawind provides an update on its recent 6 MW offshore model, uploaded Dec. 17, 2014, URL: http://www.windpowerengineering.com/featured/business-newsprojects/seawind-provides-update-recent-seawind-6-mw-offshore-model/, 3 pages.

* cited by examiner

FIG. 1
FIG. 2
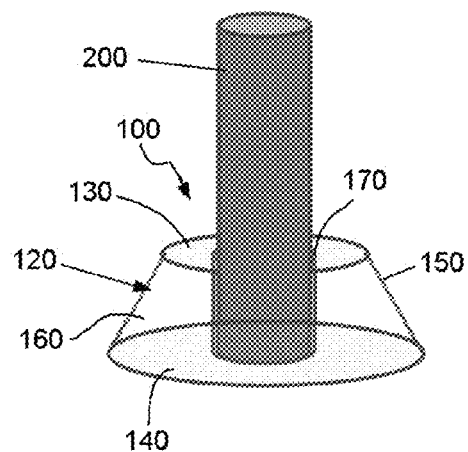
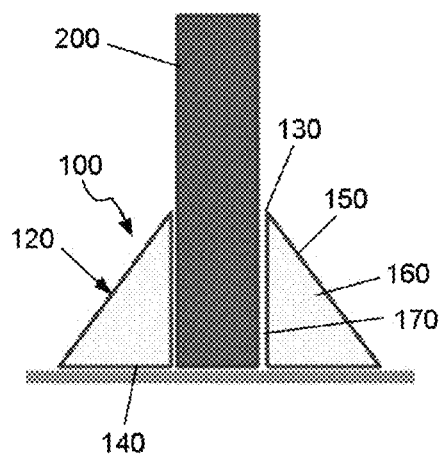
FIG. 3
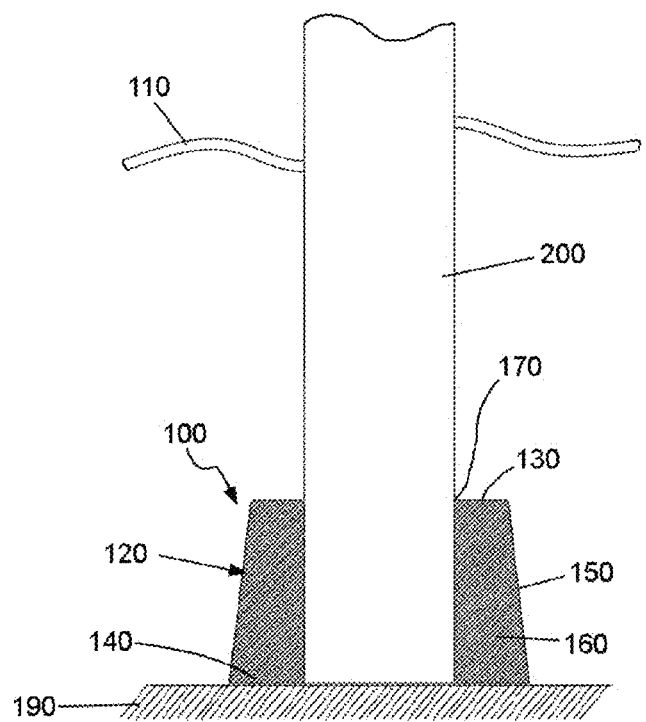

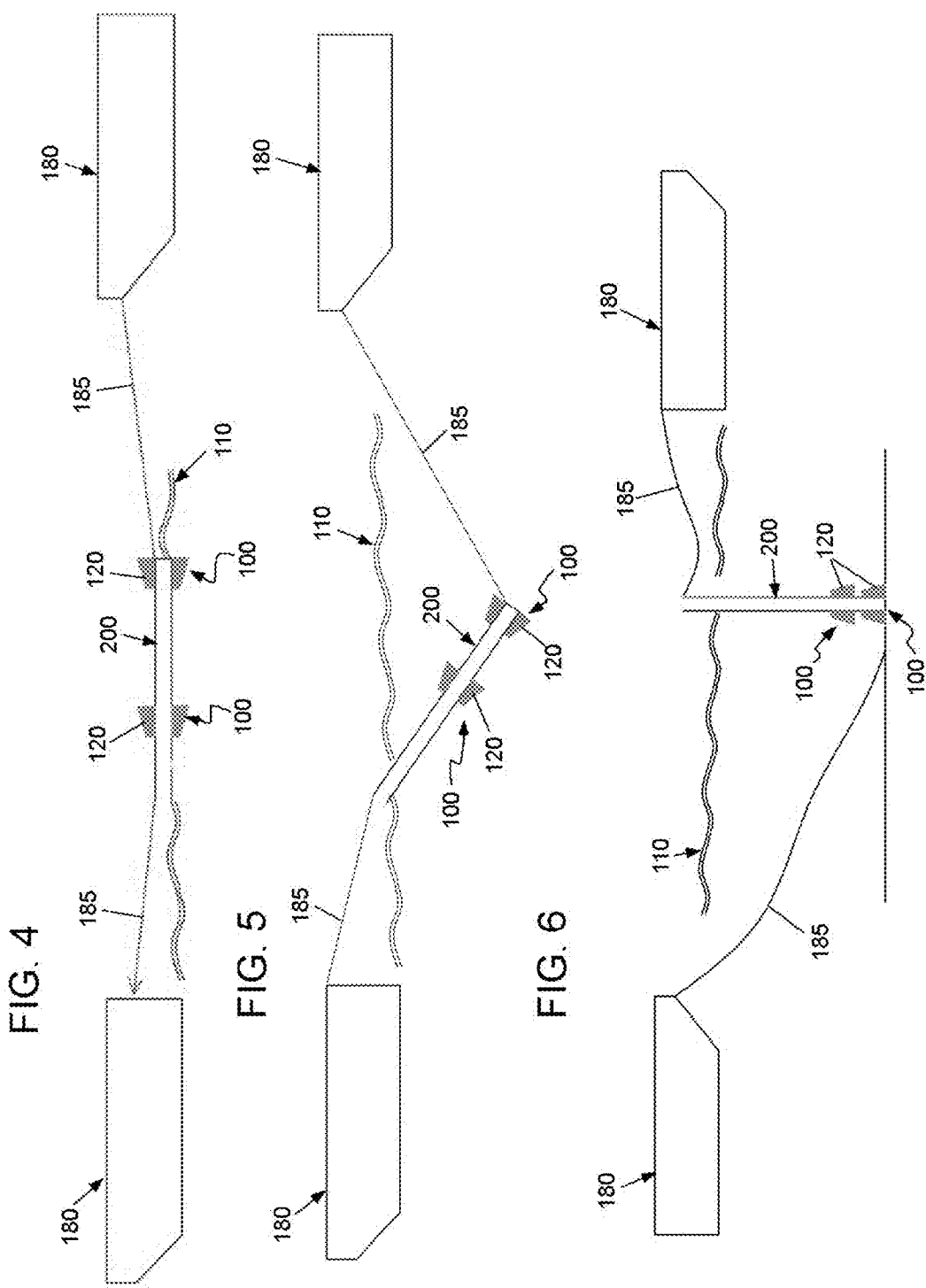

WIND TURBINE PARTS HANDLING METHOD AND DEVICE

The application claims priority to European Application No. 15382116.0, filed Mar. 13, 2015, the entire contents of which are hereby incorporated by reference.

The present disclosure refers to handling of wind turbine parts, such as piles and other structures in offshore applications.

BACKGROUND

A great number of offshore wind structures are supported and anchored into the soil under the seabed level through different types of foundations such as pile structures. Pile structures may be of the monopole type or they may comprise smaller diameter piles which are used depending on the specific support structure and soil conditions at the wind farm site.

Handling of wind turbine parts such as the piles and other structures in offshore applications is cumbersome and represents significant costs. Costs involved by handling operations are increasingly higher due to the huge size of current wind turbines which require greater foundations. In addition, said handling operations are unsafe.

Piles are usually transported from a base port to an installation site by vessels. This often requires the use of complex equipment such as large vessels, pile grippers and cranes. All of this involves very high day rates.

It is also known in the art towing wind turbine parts, such as for example piles, for transportation in the sea. Transportation of piles, or other parts, by towing, requires thorough analysis, fulfillment of requirements and respect for restrictions linked to transport speed and weather conditions. These operations also require auxiliary equipment and structures. For example, the parts to be transported on the sea are designed to include internal or external compartments or floating members to provide floating stability on the sea. Specifically, pile transport and installation operations involve potentially risky operations associated with the complex auxiliary equipment and structures required. For example, transportation and installation means and parts often include large dynamically positioned or jack-up vessels, high capacity cranes, ample deck space for storage and manipulation, auxiliary vessels such as tugs, barges or supply vessels, auxiliary equipment like pile grippers, inserts or lifting openings and lugs or plugs that may be removed off the compartments.

The use of floating members is disclosed, for example, in EP2318701 which provides a method of transportation of a floating wind turbine. The method consists in towing a wind turbine by means of a floating member that is attached to the wind turbine. This method involves positioning the wind turbine in an inclined position for being towed. This results in that the process is conducted under unstable working conditions with associated restrictions and risks.

There is thus a need for safe means for the transportation of wind turbine parts through a simple and cost effective global, integrated solution, not only for transporting wind turbine parts from a base port to a wind farm site but upending and installation of the parts and even temporarily supporting them prior to piling to some depth.

SUMMARY

The present disclosure refers to handling of offshore parts such as pile structures to be transported over a water surface.

As used herein, offshore refers to water based transportation, not only in the oceans or seas but also in rivers, lakes, etc. The term offshore within the meaning of the present disclosure is not limited to the above applications.

Also as used herein, handling refers to a number of operations involving offshore parts such as offshore wind turbine parts including transportation, upending, positioning, etc.

A method for handling offshore parts is described herein. The method can be carried out through the use of one or a number of handling devices. For example, several handling devices may be used in a modular way to carry out the present method. In that case, the several modules could have complementary shapes allowing compact configurations where one or more modules would be in close contact.

The handling devices have at least one floating member. The floating member has first and second mutually opposite portions. For example, when an offshore wind turbine pile is an upended, i.e. upright, position, the first portion and the second portion of the floating member correspond respectively to an upper portion and a lower portion, i.e. the base, of the floating member.

Between the first portion and the second portion of the floating member a transitional surface is provided. The transitional surface at least partially extends between the first and second portions defining an interior. In the interior of the floating member, at least one offshore part receiving portion is formed adapted to at least partially receive an offshore part.

Once one or a number of handling devices has been provided, the floating member is installed in the offshore part so that it at least partially surrounds the outer surface of the offshore part. When the floating member has been installed in the offshore part, the offshore part floats on the water such that it can be transported on the water to an intended destination.

A step of upending the offshore part may be performed. This is carried out by immersing one end of the offshore part in the water for erecting it appropriately. Such offshore part upending step may be carried out by adjusting floatability of the floating member or members. This may for example consist in varying either the weight or the density of a ballast material provided in the interior of the floating member. The floating member may be filled with any suitable fluid such as air.

The conical shape or other forms such as drop-shaped and bullet-shaped are advantageous for transportation, with the minor surface thereof arranged in the direction of travel, but also for upending, with the major surface thereof on the bottom of the sea.

For example, handling operations such as the above mentioned upending operation can be performed remotely. The ballast material can be controlled remotely. For example, the quantity of ballast material provided in the interior of the floating member can be adjusted remotely through for example the use of a flexible hose.

The ballast material may be, for example, a mixture of water and sand. Other ballast materials can be also used. In general, ballast material with a density of the order of from 1.3 to 1.8 times the water density may be used.

When the offshore part has reached its destination transported by the above described handling device, the offshore part can be then upended and stabilized on the seabed, or other location as required. Then, piling can be performed.

Finally, the handling device may be removed from the offshore part. Removal or disengagement of the handling device may be carried out remotely through any suitable means.

It is also possible to abandon the handling device attached to the offshore part where appropriate to benefit from additional advantages during the design life of said offshore part. For example, the handling device could be left attached to a pile structure near its top extremity. In an installed configuration, this would typically be approximately above the seabed level. Leaving the handling device attached to the pile structure helps to at least reduce scouring effects and provides further advantages such as serving as a cable guide or other functions.

As described above, the device for handling offshore parts comprises at least one floating member. When the handling device is mounted in the offshore part, the floating member at least partially surrounds the offshore part outer surface.

The floating member has first and second mutually opposite portions between which a transitional surface extends. In some cases, the transitional surface might be arranged partially extending between the first and second mutually opposite portions. This configuration defines an interior where at least one offshore part receiving portion is formed. The offshore part receiving portion is adapted to at least partially receive an offshore part such as a wind turbine pile, a wind turbine foundation, a wind turbine support structure or a wind turbine blade.

The offshore part receiving portion may be, for example, a through hole or a blind hole. In some examples, the transitional surface may be curved. Still in further examples, the offshore part receiving portion might be adapted to removably receive the offshore part.

In any case, it may be preferred that the configuration of the floating member is one selected from the group consisting of conical shape, drop-shaped and bullet-shaped. However, other shapes may be used as required.

The present device for handling offshore parts may further comprise an assembly for attachment to external handling equipment.

Still in further examples of the handling device, the floating member may be provided with a shell defining an interior adapted to receive the above mentioned ballast material therein. It may be preferred that the floating member has inlet and outlet ports for loading and unloading the ballast material. The shell may be made, for example, from a material such as polymer or metal-based material.

The above described method and device has been found to be a very efficient integrated solution for floatability and on-bottom stability a well as transportation, stocking, positioning, upending and installation operations for offshore parts. With such method and device offshore parts can be effectively upended and manoeuvres, such as transition from horizontal to vertical positions can be carried safely and with reduced costs due to simplicity. In addition, the possibility of using regular barges, tug vessels and the like, without requiring heavy lifting and the associated vessel and crane equipment spreads that involve high daily rates so costs are reduced as compared to prior art methods and devices.

Furthermore, costs are also reduced in installation operations as compared with prior art methods using costly grippers, jack-up or dynamically positioned (DP) vessels, crane supports. As compared with prior art techniques, with the present method and device, the operations can be interrupted if required.

In addition, the above described method and device provide efficient independent temporary on-bottom stability prior to piling. One important advantage is that the above mentioned handling operations such as transportation, stocking, positioning and upending can be entirely remotely operated without operators or diver support. The present device for handling offshore parts may be quickly, remotely disassembled and retrieved. Among others, advantages stemming from this feature are increased availability weather windows and the possibility of abandonment for resuming an installation campaign at a later time.

Transportation through the present method and device is also safer than using prior art devices including plugs. The present device is more robust than such plug-based solutions which have been shown to fail leading to costly recovery operations.

Through the above described method and device, synergies are advantageously achieved with complementary functions such as piling noise mitigation, cable protection and support, temporary or permanent scour protection, borehole drilling for soil investigations, socket drilling on rock, oil and gas subsea structures/applications. In addition, leaving the handling device attached to the offshore part once the offshore part has been installed, for example into the seabed, provides a number of advantages such as reducing or mitigating scouring effects, while also providing further advantages such as serving as a cable guide or other functions.

Additional objects, advantages and features of examples of the present method and device will become apparent to those skilled in the art upon examination of the description, or may be learned by practice of the disclosure.

BRIEF DESCRIPTION OF THE DRAWINGS

Particular examples of the present method and device will be described in the following by way of non-limiting examples, with reference to the appended drawings, in which:

FIG. 1 is a diagrammatic perspective view of a first example of a device for handling an offshore wind turbine part;

FIG. 2 is a diagrammatic sectional representation of a second example of a device for handling an offshore wind turbine part;

FIG. 3 is a diagrammatic sectional representation of the handling device shown in a first example installed at sea;

FIG. 4 is a diagrammatic elevational view of the handling device as used in transportation of an offshore wind turbine part; and FIGS. 5 and 6 are diagrammatic elevational views of the handling device as used in upending an offshore wind turbine part.

DETAILED DESCRIPTION OF EXAMPLES

In the examples shown, the handling device 100 is intended for transporting structures such as 50 m long, 2-12 m diameter monopole structures 200 on water surface 110 such as oceans, seas, rivers, lakes, or the like. Other dimensions and types of structures are also envisaged. For example, depending on the specific applications, the monopole structures might be 25-90 m long. Structures other than monopole structures can be also handled by the present device 100 such as jacket or tripod structures which may be of the order of 25-120 m long and 1.5-3.5 m in diameter. Wind turbine foundations, support structures, blades, and the like can be also handled by the present device 100.

Several handling devices 100 may be used to handle the offshore wind turbine structures as shown in FIGS. 4-6 of the drawings.

The handling device 100 comprises one floating member 120 made of a suitable material such as, for example, a suitable polymer or metal-based material.

The floating member 120 is a hollow body defined by first and second mutually opposite portions 130, 140. Two different floating members 120 have been illustrated in FIGS. 1 and 2 of the drawings.

The floating member 120 in the example shown in FIG. 1 is in the form of a truncated cone such that the first and second mutually opposite portions 130, 140 are substantially ring surfaces. Suitable dimensions for the floating member 120 in the example shown in FIG. 1 are as follows: 7-14 m outside diameter major surface, and 5-12 m outside diameter minor surface for a 3.5-8.50 m high truncated cone. Other dimensions are of course not ruled out.

The floating member 120 in the example shown in FIG. 2 is cone shaped such that the first portion 130 corresponds to the upper edge of the cone while the second portion is a bottom ring surface. Other shapes for the floating member 120 such as drop-shaped and bullet-shaped are also envisaged. In any case, a straight transitional surface 150 extends between the first and second portions 130, 140 defining an interior 160. The transitional surface 150 might be curved in some cases as required.

A part receiving portion 170 is defined inside the floating member 120. The part receiving portion 170 is adapted to removably receive the monopole structure 200. The part receiving portion 170 of the floating member 120 is a through or blind hole. When the monopole structure 200 is fitted inside the part receiving portion, the floating member 120 completely surrounds the monopole structure 200. The part receiving portion 170 may be arranged at a central portion of the floating member 120 but offset positions may be also possible if required.

The interior 160 of the floating member 120, that is, the volume defined between the part receiving portion 170 and the transitional surface 150 inside the floating member 120, is adapted to receive ballast material. The ballast material may be any material such as, for example, a mixture of water and sand. Although not shown, inlet and outlet ports may be provided in the floating member 120 for loading and unloading the ballast material as required.

Now referring to FIGS. 4-6, a number of handling devices 100 are provided for handling a wind turbine monopole structure 200. For transportation in the sea, for example, regular barges or tug vessels 180 are used suitable for towing the monopole structure 200 through the use of appropriate tow ropes 185. Once the corresponding floating members 120 have been installed at least partially surrounding the monopole structure 200, the monopole structures 200 can be towed floating in the sea through the vessels 180 to an intended destination as shown in FIG. 4.

Upending of the monopole structure 200 is shown in FIGS. 5-6 of the drawings. When the monopole structure 200 has reached an intended destination, one end of the monopole structure 200 is immersed into the sea. This may be carried out remotely by controlling the ballast material in the interior 160 of the floating member 120. The amount of ballast material in the floating member 120 can be adjusted through for example a flexible hose. Controlling the quantity (i.e. mass, volume or even density) of the ballast material inside the floating member 120 allows floatability of the handling devices 100 to be adjusted providing on-bottom stability for the monopole structure 200 for erecting it appropriately.

Once erected, the monopole structure 200 is stabilized on the seabed 190 as shown in FIG. 6 of the drawings in order to perform pilling thereafter. The handling devices 100 are then removed from the monopole structure 200 remotely through any suitable means.

Although only a number of particular examples of the present method and device have been disclosed herein, it will be understood by those skilled in the art that other alternative examples, uses and obvious modifications and equivalents thereof are possible. For example, in some cases, the present offshore part handling device could be left in the water after the installing the offshore part, for example, after piling, that is, permanently installed on the offshore part. On the other hand, the cross sectional geometry of the floating member could be not circular, but polygonal or irregular, at least some of which could be closed or not. The cross sectional geometry of the floating member could include shaped portions for receiving parts projecting from the offshore part, for example.

The present disclosure thus covers all possible combinations of the particular examples described. Thus, the scope of the present disclosure should not be limited by particular examples, but should be determined only by a fair reading of the claims that follow.

The invention claimed is:

1. A method for handling offshore parts, comprising the steps of:
   providing at least one handling device having at least one floating member with first and second mutually opposite portions between which a transitional surface extends and defines an interior of the floating member, and at least one offshore part receiving portion formed in the interior and adapted to at least partially receive the offshore part, the offshore part having a top section spaced apart from a bottom section, and
   installing the floating member on the top section of the offshore part so that the floating member at least partially surrounds an outer surface of the offshore part and such that the offshore part floats on water in a horizontal orientation, the floating member being slidably coupled to the offshore part,
   driving the offshore part to an intended destination with the offshore part in the horizontal position, and
   upending the offshore part by immersing the bottom section in the water for erecting the offshore part while controlling an amount of ballast material in the interior of the floating member to cause the floating member to slide along and towards the bottom section of the offshore part thereby causing the offshore part to assume a vertical erected position in the water, wherein the floating member is positioned at the bottom section of the offshore part when the upending step is completed and the offshore part is in the vertical erected position.

2. The method according to claim 1, wherein the method further comprises the step of removing the handling device from the offshore part.

3. The method according to claim 1, wherein the ballast material has a density from 1.3 to 1.8 times that of the water in which the offshore part is erected.

4. A device for handling offshore parts, the device comprising:

at least one floating member having first and second mutually opposite portions, between which a transitional surface extends and defines an interior of the floating member, the floating member comprising a shell defining an interior adapted to receive ballast material therein, the shell having a shape and configuration so as to be disposed directly against the offshore part, the floating member shell having at least one receiving portion adapted to at least partially receive the offshore part such that the floating member at least partially surrounds an outer surface of the offshore part and is slidably coupled to the offshore part, the offshore part having a top section spaced apart from a bottom section, the bottom section of the offshore part being configured to contact an offshore bed, the floating member configured to be received on the top section of the offshore part and slidable along the offshore part;

ballast material having a density from 1.3 to 1.8 times that of water in which the offshore part is erected, the ballast material received in the interior of the floating member;

wherein the offshore part is erected by immersing the bottom section in the water while controlling an amount of the ballast material received in the interior of the floating member to cause the floating member to slide along and towards the bottom section of the offshore part, wherein the floating member is positioned at the bottom section of the offshore part when the offshore part is erected.

5. The device according to claim 4, wherein the device further comprises an assembly for attachment to external handling equipment.

6. The device according to claim 4, wherein the receiving portion is a through hole.

7. The device according to claim 4, wherein the receiving portion is a blind hole.

8. The device according to claim 4, wherein the transitional surface extends between the first and second mutually opposite portions.

9. The device according to claim 4, wherein the floating member has a shell defining an interior adapted to receive ballast material therein.

10. The device according to claim 4, wherein the floating member has inlet and outlet ports for loading and unloading the ballast material.

11. The device according to claim 4, wherein the receiving portion is adapted to removably receive the offshore part.

12. The device according to claim 4, the floating member is conical shaped, drop-shaped, or bullet-shaped.

13. The device according to claim 4, wherein the transitional surface is curved.

14. The device according to claim 1, wherein the receiving portion of the floating member is adapted to at least partially receive a wind turbine pile, a wind turbine foundation, a wind turbine support structure or a wind turbine blade.

15. The device according to claim 4, wherein the ballast material has a density from 1.3 to 1.8 times that of the water in which the offshore part is erected.

* * * * *